United States Patent
Kobata (10) Patent No.: US 9,250,637 B2
(45) Date of Patent: Feb. 2, 2016

(54) TEMPERATURE CONTROL DEVICE AND OSCILLATOR

(71) Applicant: NIHON DEMPA KOGYO CO., LTD., Tokyo (JP)

(72) Inventor: Tsukasa Kobata, Saitama (JP)

(73) Assignee: NIHON DEMPA KOGYO CO., LTD., Tokyo (JP)

( * ) Notice: Subject to any disclaimer, the term of this patent is extended or adjusted under 35 U.S.C. 154(b) by 0 days.

(21) Appl. No.: 14/538,785

(22) Filed: Nov. 11, 2014

(65) Prior Publication Data

US 2015/0130546 A1 May 14, 2015

(30) Foreign Application Priority Data

Nov. 12, 2013 (JP) .................................. 2013-234145

(51) Int. Cl.
*H03B 5/04* (2006.01)
*G05D 23/20* (2006.01)

(52) U.S. Cl.
CPC .................................. *G05D 23/2036* (2013.01)

(58) Field of Classification Search
CPC ............ H03B 5/04; H03B 5/32; G05D 23/20; G05D 23/2036
USPC ................... 331/69, 70, 116 R, 154, 158, 176
See application file for complete search history.

(56) References Cited

U.S. PATENT DOCUMENTS

| | | | | |
|---|---|---|---|---|
| 2007/0024292 | A1* | 2/2007 | Greenberg et al. | 324/721 |
| 2008/0106451 | A1* | 5/2008 | Jeong et al. | 341/155 |
| 2008/0164952 | A1* | 7/2008 | Babitch | 331/66 |
| 2013/0033332 | A1* | 2/2013 | Akaike et al. | 331/70 |

FOREIGN PATENT DOCUMENTS

JP 2001-075605 3/2001

* cited by examiner

*Primary Examiner* — Jeffrey Shin
(74) *Attorney, Agent, or Firm* — Jianq Chyun IP Office (57) ABSTRACT

A temperature control device includes a temperature detector, a difference operation unit, a controller, a saturation processing circuit unit, a rewritable storage unit, and a conversion unit. The difference operation unit operates a digital value corresponding to a difference value between a detected temperature value and a target temperature. The controller calculates a manipulated variable using the digital value operated by the difference operation unit. The saturation processing circuit unit includes a digital circuit to limit an output value of the controller to a pre-set upper limit value. The rewritable storage unit stores the upper limit value read from a storage area of the rewritable storage unit and input into the saturation processing circuit unit. The conversion unit converts the output value of the saturation processing circuit unit into an analog signal to output the converted value as a control command value to the heater.

13 Claims, 6 Drawing Sheets

TEMPERATURE CONTROL DEVICE AND OSCILLATOR

CROSS-REFERENCE TO RELATED APPLICATION

This application claims the priority benefit of Japanese application serial no. 2013-234145, filed Nov. 12, 2013. The entirety of the above-mentioned patent application is hereby incorporated by reference herein and made a part of specification.

BACKGROUND

1. Technical Field

The disclosure relates to a technique to control a temperature of a heated body that is heated by a heater to a target temperature.

2. Description of the Related Art

A situation, which an electronic component is heated to a constant temperature by a heater to stabilize the characteristics of the electronic component, is existed. As an example, what is called an oven crystal controlled oscillator (OCXO) is illustrated. Since a crystal unit changes its frequency in response to the temperature, this type of crystal controlled oscillator is used when an output frequency with high stability is required.

The OCXO detects temperature in the atmosphere using a temperature detector disposed near the crystal unit, adjusts a temperature of a heater in according to the temperature in the atmosphere, and controls the temperature in the atmosphere of frequency oscillation unit. Thus, after the OCXO is started up, the temperature in the atmosphere of frequency oscillation unit is gradually brought close to a setting value while the temperature repeats overshooting to a higher temperature side than the setting value and undershooting to a lower temperature side than the setting value. The maximum value of a start-up current that flows through the OCXO at that time and the time required for stabilization of the frequency are determined by an arrangement layout and a specification of hardware such as transistors and resistors that constitute the OCXO circuit. However, since the start-up time and the start-up current required by a customer depend on an intended use, an oscillator has to be adjusted by rearranging a hardware constitution according to a customer requirement.

Japanese Unexamined Patent Application Publication No. 2001-75605 discloses a technique using feedback control to reduce the overshooting and the undershooting of the start-up current. However, the magnitude of the start-up current and the time required for starting up are not made variable.

SUMMARY

The disclosure has been made under these circumstances, and it is an object of the disclosure to provide a temperature control device that can select priorities between the time required for stabilization of the temperature and the magnitude of the start-up current of the temperature control device that controls the temperature by controlling power supplied to a heater. In addition, it is another object of the disclosure to provide an oscillator that can select priority between the time required for stabilization of the oscillation frequency of the crystal unit and the magnitude of the start-up current.

A temperature control device according to the disclosure is for controlling a temperature of a heated body heated by a heater to a target temperature. The temperature control device includes: a temperature detector, a difference operation unit, a controller, a saturation processing circuit unit, a rewritable storage unit, and a conversion unit. The temperature detector detects a temperature corresponding to the heated body. The difference operation unit operates a digital value corresponding to a difference value between a detected temperature value detected by the temperature detector, and the target temperature. The controller calculates a manipulated variable using the digital value operated by the difference operation unit as an input value and outputs the manipulated variable as the digital value. The saturation processing circuit unit is connected to a rear stage of the controller and including a digital circuit to limit an output value of the controller to a pre-set upper limit value. The rewritable storage unit stores the upper limit value. The upper limit value is read from a storage area of the rewritable storage unit and is input into the saturation processing circuit. The conversion unit converts the output value of the saturation processing circuit into an analog signal to output the converted value as a control command value to the heater.

An oscillator according to the disclosure includes: the above-described temperature control device, an oscillator circuit connected to a crystal unit as the heated body, and a connection unit to be connected to an external computer, and the external computer is to rewrite the upper limit value stored in the storage unit.

The disclosure provides a temperature control device which includes a saturation processing circuit having a digital circuit for limiting an output value of a controller to an upper limit value, and to store the upper limit value in a rewritable storage unit. When the upper limit value is increased, a temperature stabilizing time of a heated body is reduced, and the maximum current of the heater becomes large. On the other hand, when the upper limit value is reduced, the temperature stabilizing time of the heated body is increased, and the maximum current of the heater becomes small. Thus, with the disclosure, freely setting or selecting the upper limit value in the storage unit allows adjusting the priority between the reduction of the temperature stabilizing time of the heated body and the suppression of the maximum current of the heater start-up. In addition, in the case where the disclosure is applied to an oscillator using a crystal unit, the priority between the reduction of the stabilizing time of the oscillation frequency and the suppression of the maximum current of the heater can be adjusted at start-up. Thus, a manufacturer can easily produce the oscillator corresponding to the requirement for the priority of each user.

DETAILED DESCRIPTION

Figure 1:
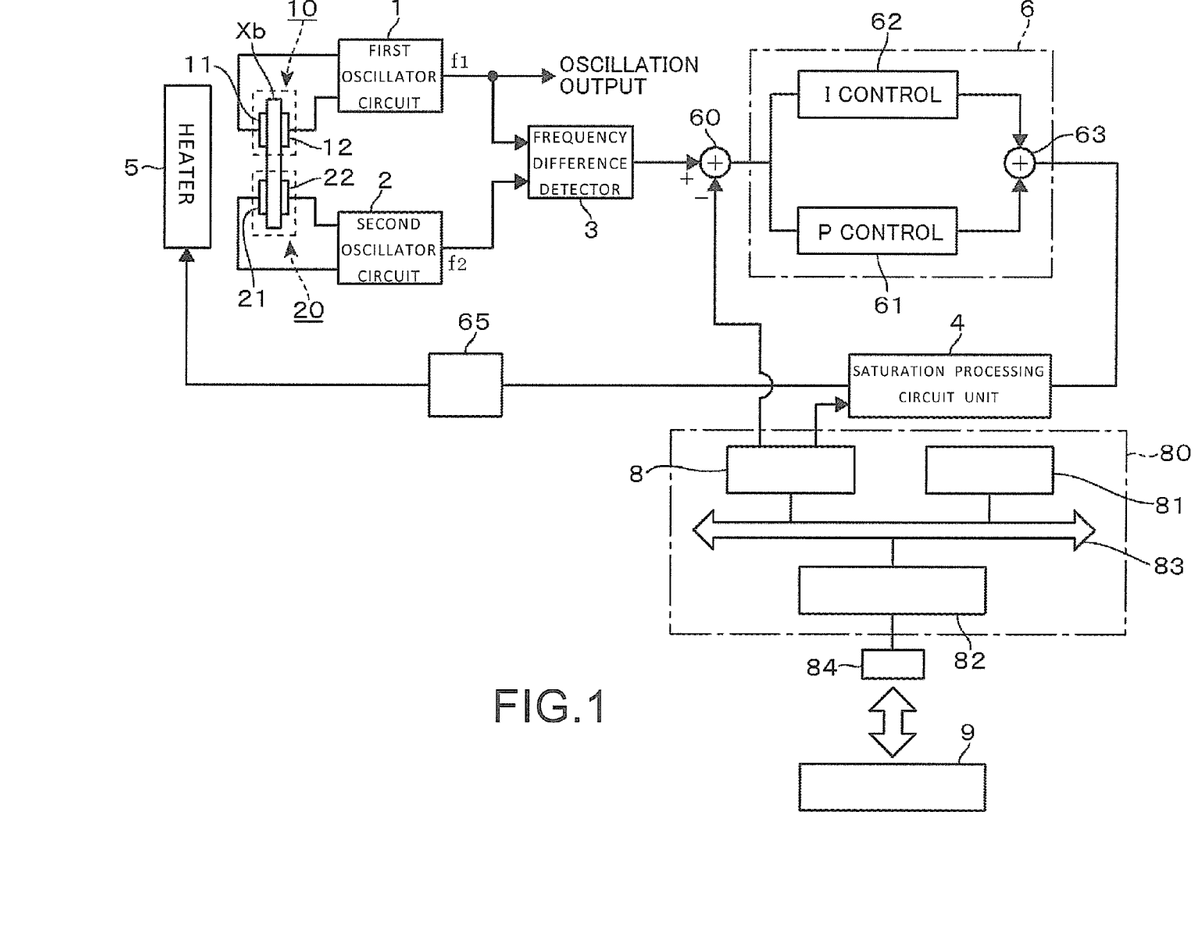
FIG. 1 is a block diagram illustrating a configuration of an OCXO including a temperature control device according to an embodiment of the disclosure.

FIG. 1 is a block diagram illustrating a whole oscillator using a temperature control device according to an embodiment of the disclosure. This oscillator is configured as an OCXO. The oscillator includes a first crystal unit 10 and a second crystal unit 20. The first crystal unit 10 and second crystal unit 20 employ a common crystal element Xb. The crystal element employed for the first crystal unit 10 may be different from a crystal element employed for the second crystal unit 20.

For example, the strip-shaped crystal element Xb is divided into two areas in the longitudinal direction, and then electrodes for vibration-excitation are provided on both front and back surfaces of the respective divided areas (vibration areas). Accordingly, the first crystal unit 10 includes one of the divided areas and a pair of electrodes 11 and 12. The second crystal unit 20 includes the other one of the divided areas and a pair of electrodes 21 and 22. Thus, the first crystal unit 10 and second crystal unit 20 can be considered to be thermally connected.

The first crystal unit 10 and the second crystal unit 20 are respectively connected to a first oscillator circuit 1 and a second oscillator circuit 2. Both outputs of the oscillator circuits 1 and 2 may be, for example, overtones (higher harmonics) of the crystal units 10 and 20 or also may be the fundamental waves of the crystal units 10 and 20.

Here, for convenience, assuming that a frequency signal having a frequency f1 is output from the first oscillator circuit 1, while a frequency signal having a frequency f2 is output from the second oscillator circuit 2, the frequency signal having the frequency f1 is output as, for example, an oscillation output of the oscillator. Reference numeral 3 in FIG. 1 denotes a frequency difference detector. The frequency difference detector 3 is, to schematically say, a circuit unit to obtain f2−f1−Δfr, which is a difference between Δfr and a difference between f1 and f2. The value Δfr is a difference between f1 (f1r) and f2 (f2r) at a reference temperature, for example, 25° C. For example, one example of difference between f1 and f2 is several MHz. The disclosure comes into effect by calculating a value ΔF, which is a difference between a value corresponding to a difference between f1 and f2 and a value corresponding to a difference between f1 and f2 at the reference temperature, for example, 25° C. using the frequency difference detector 3. In particular, the value obtained by the frequency difference detector 3 is {(f2−f1)/f1}−{(f2r−f1r)/f1r} in this embodiment.

Figure 2:
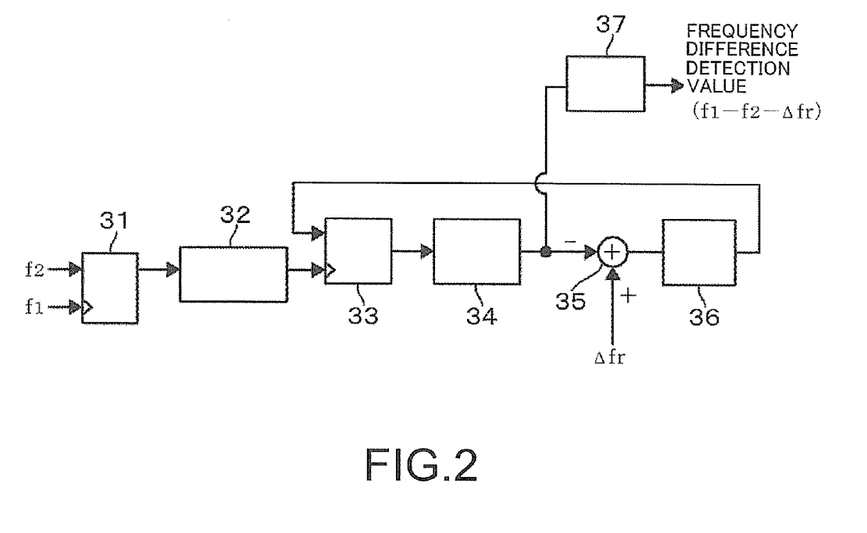
FIG. 2 is a block diagram illustrating a frequency difference detector provided in the temperature control device.

FIG. 2 illustrates a concrete example of the frequency difference detector 3. Reference numeral 31 denotes a flip-flop circuit (F/F circuit) with two input terminals. A frequency signal having the frequency f1 is input into one of the input terminals of the flip-flop circuit 31 from the first oscillator circuit 1, while a frequency signal having the frequency f2 is input into the other one of the input terminals from the second oscillator circuit 2. The frequency signal having the frequency f2 from the second oscillator circuit 2 is latched by the frequency signal having the frequency f1 from the first oscillator circuit 1. Hereinafter, the f1 and f2 are assumed to indicate the frequencies or frequency signals themselves to avoid redundancy of the description. The flip-flop circuit 31 outputs a signal having a frequency (f2−f1)/f1, which is a value corresponding to a frequency difference between f1 and f2.

Figure 3:
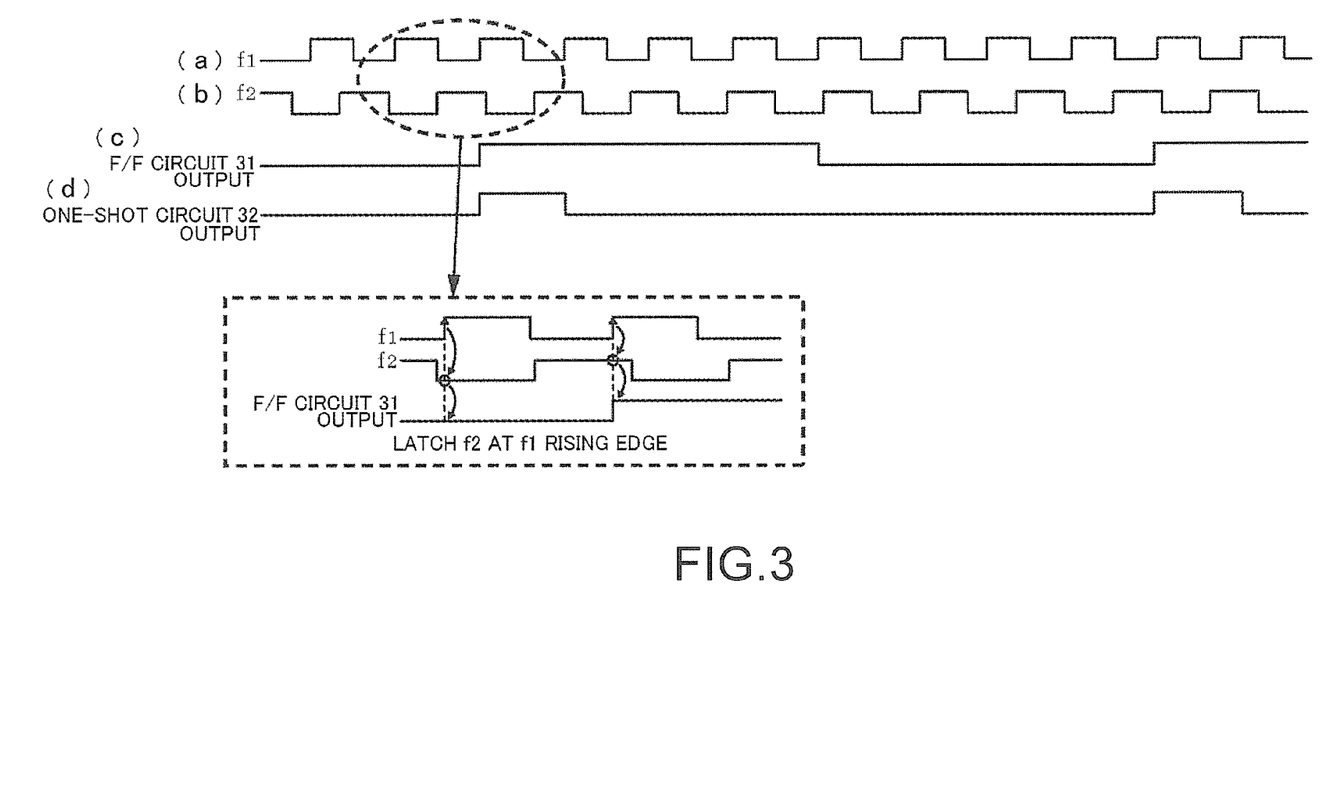
FIG. 3 is an explanatory drawing of an input and output waveform of the frequency difference detector.

At a subsequent stage of the flip-flop circuit 31, a one-shot circuit 32 is disposed. The one-shot circuit 32 outputs a one-shot pulse at the rising edge of the pulse signal obtained from the flip-flop circuit 31. FIG. 3 is a timing chart of a series of signals described by this point, as shown as (a)~(d) in FIG. 3. The one-shot circuit 32 corresponds to a pulse generation unit disposed in the frequency difference detector 3 of this example.

At a subsequent stage of the one-shot circuit 32, a Phase Locked Loop (PLL) is disposed. The PLL includes a latch circuit 33, a loop filter 34 having an integrating function, an addition unit 35, and a direct digital synthesizer (DDS) circuit unit 36. The latch circuit 33 latches a saw-tooth wave output from the DDS circuit unit 36 using a pulse output from the one-shot circuit 32. The output of the latch circuit 33 has a signal level of the saw-tooth wave at a time point when the pulse is output. The loop filter 34 integrates a DC voltage having this signal level. The addition unit 35 adds this DC voltage to a DC voltage corresponding to Δfr (a difference between f1 and f2 at a reference temperature, for example, 25° C.). The data of the DC voltage corresponding to Δfr is stored in a memory (not shown). In addition, an averaging circuit 37, which computes a moving average of input values within a pre-set period of time, is provided at the output side of the loop filter 34.

Figure 4:
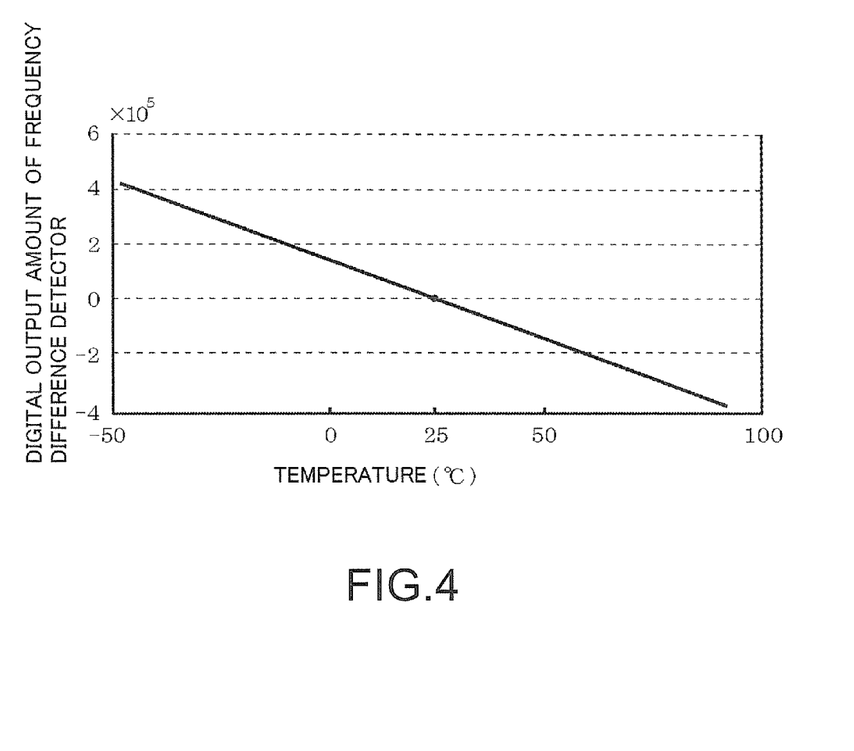
FIG. 4 is a characteristic view illustrating a relation between a digital output value of a frequency difference detector and a temperature.

FIG. 4 illustrates a relation between the digital output value of the frequency difference detector 3, and the temperature, from which it is understood that the output and the temperature have a linear relation. Accordingly, it may be considered that the output value (digital value) of the frequency difference detector 3 corresponds to the detection value of the temperature in an atmosphere where the crystal units 10 and 20 are placed. Therefore, the crystal units 10 and 20, the oscillator circuits 1 and 2 and the frequency difference detector 3, constitute a temperature detector for obtaining a digital detected temperature value.

Now returning to FIG. 1, at the subsequent stage of the frequency difference detector 3, a first addition unit 60, which is a difference operation unit, is disposed. For example, in the case of an AT-cut crystal unit, a relationship between a frequency and a temperature has a cubic curve, and then the frequency has a peak near −40° C. and a bottom near 85° C., respectively. In the case of the temperature control device of this example, a target temperature is, for example, 85° C.

As illustrated in FIG. 4, the digital output value obtained by the temperature detector (the digital output value of the frequency difference detector 3) decreases from a positive value to a negative value as the temperature increases. Accordingly, the first addition unit 60 adds a digital value, which is output from the frequency difference detector 3, to a digital value corresponding to a temperature target value, while the digital value, which is the obtained addition value, corresponds to a difference in temperature that subtracts the temperature at that time from the target temperature. That is to say, the addition value of the first addition unit 60 decreases as the temperature approaches the target temperature of, for example, 85° C. from −40° C. Therefore, the first addition unit 60 can be considered as a difference operation unit that computes a difference value between the temperature target value and the detected temperature value.

A controller (operation unit) 6 is connected to the subsequent stage of the first addition unit 60. The operation unit 6 operates a manipulated variable for adjusting a power feeding amount to a heater 5 according to a difference value operated by the first addition unit 60. The operation unit 6 includes a P controller 61, an I controller 62, and a second addition unit 63 to obtain a manipulated variable proportional to the difference value. The P controller 61 multiplies the difference value by a proportional gain. The I controller 62 operates a time integration value of a difference value and is configured of an integration circuit. The second addition unit 63 adds the outputs of the P controller 61 and the I controller 62.

A saturation processing circuit unit 4 is connected to a subsequent stage of the operation unit 6. The saturation processing circuit unit 4 is a circuit as a setting unit for setting the upper limit value and the lower limit value of the value (input value) output from the operation unit 6 corresponding to the DC voltage supplied to the heater 5. The saturation processing circuit unit 4 is configured to: output the lower limit value when the input value is smaller than the lower limit value, output the upper limit value when the input value is larger than the upper limit value, and directly output the input value when the input value is between the lower limit value and the upper limit value.

Figure 5:
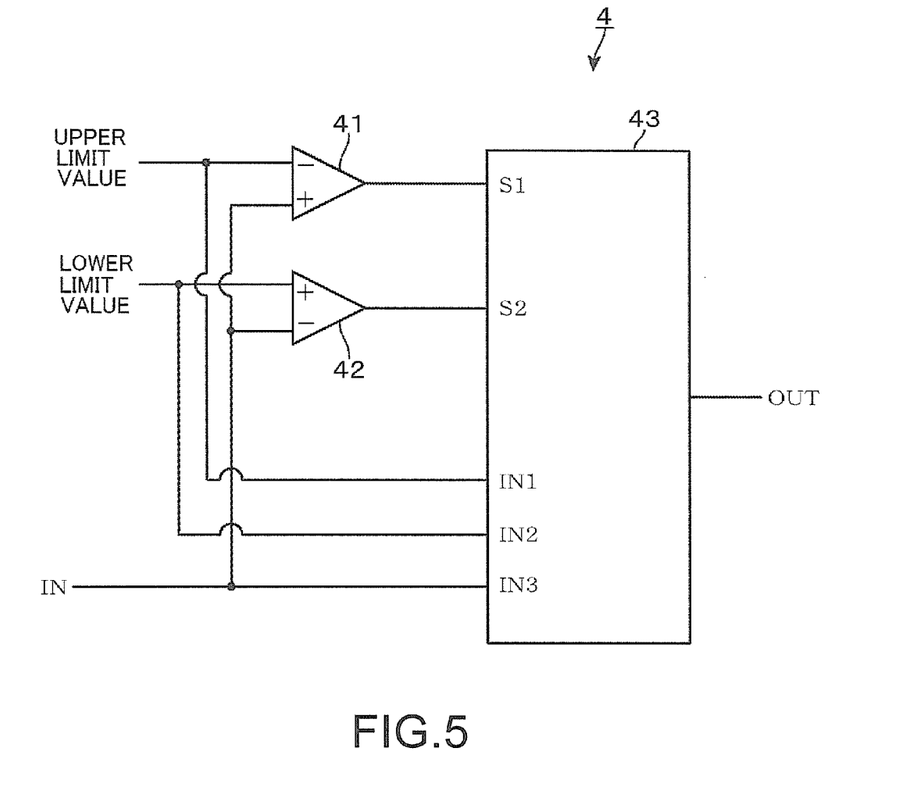
FIG. 5 is a block diagram illustrating a saturation processing circuit unit provided in the temperature control device.

In, this example, as illustrated in FIG. 5, the saturation processing circuit unit 4 includes, for example, digital comparators 41 and 42 and a selector 43. The upper limit value read from a memory 8, which will be described later, is input into a negative input terminal of the digital comparator 41 at one side, while the lower limit value read from the memory 8, which will be described later, is input into a positive input terminal of the digital comparator 42 at the other side. The input value (IN) is input into the positive input terminal of the digital comparator 41 and the negative input terminal of the digital comparator 42. This input value (IN) is an additional value obtained by the addition unit 63. The upper limit value and the lower limit value, which are read from the memory 8 described later, are input into terminals IN1 and IN2 of the selector 43, respectively. The input value (IN) is input into a terminal IN3 of the selector 43. An output of the digital comparator 41 and an output of the digital comparator 42 are input into terminals S1 and S2 of the selector 43, respectively.

On-off of an internal switch is selected by a combination of logical values input into terminals S1 and S2 of the selector 43, one of the input terminals IN1 to IN3 is selected, and then the selected input value is output. The selector 43 is configured such that a correspondent relation between the combination of the logical values of S1 and S2, and the output meets a relation illustrated in Table 1. Table 1 is an explanatory drawing illustrating a correspondent relation of logical values in the saturation processing circuit unit.

TABLE 1

| S1 | S2 | OUTPUT |
|----|----|--------|
| 0 | 0 | IN3 (INPUT VALUE) |
| 1 | 0 | IN1 (UPPER LIMIT VALUE) |
| 0 | 1 | IN2 (LOWER LIMIT VALUE) |
| 1 | 1 | — |

For example, a controller 80 constituting a control unit is connected to the saturation processing circuit unit 4, and the controller 80 includes the memory 8, a CPU 81 and an interface 82. Here, reference numeral 83 in FIG. 1 denotes a bus. The upper limit value and the lower limit value in the saturation processing circuit unit 4 are stored in the memory 8 as, for example, a 16-bit digital value and are each read from the memory 8 by the CPU 81. The interface 82 is connected to a connection terminal unit 84 that becomes a connection unit. An external computer 9 is connected to the connection terminal unit 84. The interface 82 is configured such that the upper limit value and the lower limit value stored in the memory 8 are changed by an instruction from the external computer 9.

A signal output from the selector 43 is input into a D/A converter 65. The D/A converter 65 is a conversion unit for converting a digital signal into an analog signal. The D (digital)/A (analog) converter 65 outputs the DC voltage of an amount corresponding to the digital value output from the selector 43. At a subsequent stage of the D/A converter 65, the heater 5 is disposed. For example, the heater 5 includes a transistor and a resistor. The transistor has a base connected to the output terminal of the D/A converter 65, and a collector connected to a power source unit (not shown). The resistor is connected between an emitter of the transistor and the ground. The relation between the voltage supplied to the base of the transistor, and the total power of the power consumption of the transistor and the power consumption of the resistance has a linear relation. This allows a linear control of the heating amount of the heater 5 based on the manipulated variable obtained by the P controller 61 and the I controller 62. In this example, the transistor is also a part of the heater 5, and the crystal units 10 and 20 and the heater 5 are housed in a common housing.

The following description describes the action of the above-described embodiment. First, a manufacturer preliminarily connects the external computer 9 to the oscillator and sets the upper limit value and the lower limit value in the saturation processing circuit unit 4 stored in the memory 8 from the external computer 9, according to a request from a user. The respective upper limit value and lower limit value stored in a storage area of the memory 8 are read and input into the saturation processing circuit unit 4 as illustrated in FIG. 5. As one example of cases that the user uses the oscillator, assume that the user sets the target temperature input into the first addition unit 60 to 85° C. and uses the oscillator at an atmospheric temperature of −40° C. Namely, the temperature (detected temperature value) detected by the first and second crystal units 10 and 20 becomes −40° C.

The difference value operated by the operation unit 6 is a large value that corresponds to the difference in temperature (85° C.-(−40° C.)) between the target temperature and the detected temperature value. Without the saturation processing circuit unit 4, the digital value operated by the operation unit 6 based on the difference value would be input into the D/A converter 65, and would be converted into a control power to be input into the heater 5.

Consequently, a large current flows into the heater 5 all at once, thus generating heat. As a result, the atmospheric temperature significantly increases from −40° C. to over 85° C., which is the target temperature. Accordingly, the addition value of the first addition unit 60, which is the value to be input into the operation unit 6, decreases, thus decreasing the current flowing into the heater 5. When the atmospheric temperature exceeds 85° C., which is the target temperature, and the output value of the first addition unit 60 becomes 0 or less, the heater 5 is turned off. This stops an increase in the atmospheric temperature, turns the temperature into decrease and thus the temperature becomes low. Thus, the current of the heater 5 becomes large by action of a control loop illustrated in FIG. 1. After the current of the heater 5 largely overshoots and undershoots in this condition, the current of the heater 5 is stabilized by repeating the small overshooting and undershooting again. As a result, the atmospheric temperature is maintained at 85° C., which is the target temperature.

Here, a case that includes the saturation processing circuit unit 4 is described. For example, when the difference in temperature between the target temperature and the temperature target value is large, the large digital value is output from the operation unit 6. The saturation processing circuit unit 4 is configured such that the value of the current flowing into the heater 5, as described above, is between the upper limit value and the lower limit value. Even when the large digital value that exceeds the upper limit value is output from the operation unit 6, the input value output from the saturation processing circuit unit 4 becomes the value that does not exceed the upper limit value. Accordingly, since the large current does not flow into the heater 5 all at once, the overshooting becomes small. In addition, when the atmospheric temperature of the crystal units 10 and 20 exceeds the target temperature, the addition value of the first addition unit 60 becomes the negative value, the small digital value is output from the operation unit 6. However, when the input value becomes zero, the heater 5 is turned off. Since the overshooting of the current flowing into the heater 5 is prevented and the heating amount of the heater 5 is also prevented, the atmospheric temperature of the crystal units 10 and 20 is not greatly changed all at once even when the output of the heater 5 is turned off. Accordingly, the undershooting of the current flowing into the heater 5 is prevented.

When the atmospheric temperature is −40° C., for example, the digital value increases all at once, and thus the current flowing into the heater 5 becomes large rapidly. However, once the digital value reaches the upper limit value, the maximum value of the current is limited to the value corresponding to the upper limit value. As a result, the overshooting of the current is prevented, and the overshooting does not occur depending on the upper limit value. On the other hand, when the upper limit value becomes low, the maximum heating amount of the heater 5 becomes small. Thus, a temperature rising speed of the atmospheric temperature becomes slow. Therefore, the time required for stabilization of the atmospheric temperature becomes longer than a time for a case that does not include the saturation processing circuit unit 4. Accordingly, when prioritizing to stabilize the atmosphere in a short time, the upper limit value is simply made large, when prioritizing to decrease the maximum value of the current flowing into the heater 5, the upper limit value is simply made small.

Figure 6:
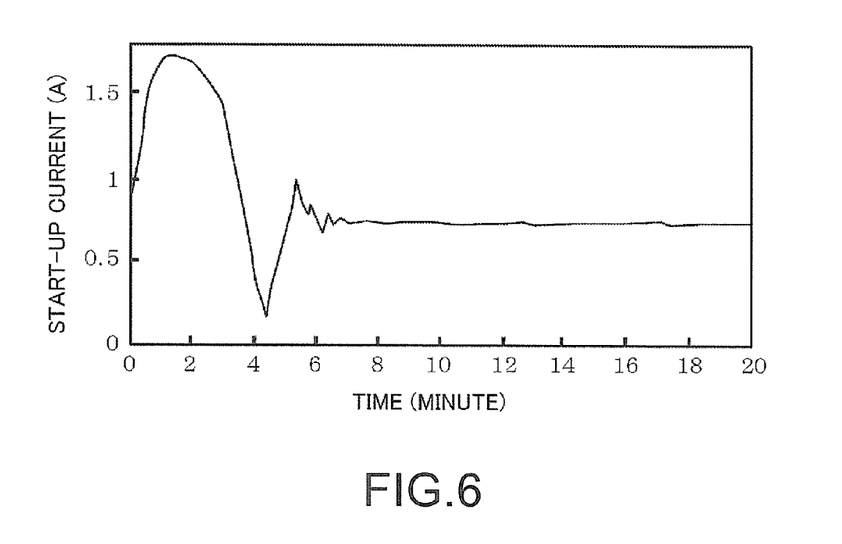
FIG. 6 is a characteristic view illustrating a start-up current corresponding to an elapsed time from an OCXO start-up according to an embodiment.
Figure 7:
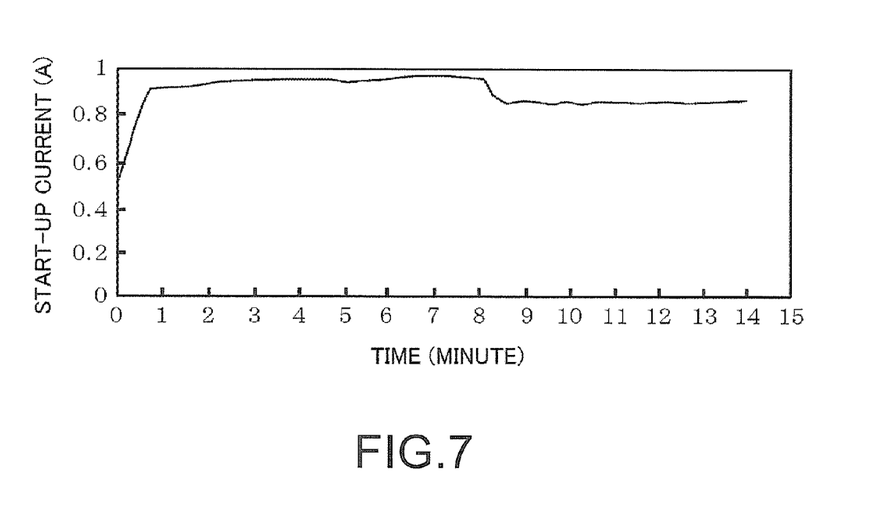
FIG. 7 is a characteristic view illustrating the start-up current corresponding to the elapsed time from the OCXO start-up according to the embodiment.

FIG. 6 illustrates a change of a start-up current in the case where the memory 8 is rewritten to respectively set the upper limit value and the lower limit value to 32767 and −32768, in the above-described oscillator. In addition, FIG. 7 illustrates a change of the start-up current when the upper limit value and the lower limit value are set to 2500 and −32768, respectively. Here, in case of the OCXO, most of the start-up current is the current flowing into the heater 5. Comparing FIG. 6 with FIG. 7, when the upper limit value is set to the high value, the upper limit of the current value of the heater 5 becomes high. In addition, the time required for stabilization of the detected temperature value, which is a start-up time, becomes short. On the other hand, when the upper limit value is set to the low value, the upper limit of the current value of the heater 5 becomes low. Also, the start-up time becomes long. Accordingly, changing the upper limit value stored in the memory 8 adjusts priority between the start-up current of the oscillator and the time required for stabilization of an oscillation frequency.

According to the above-described embodiment, the temperature control device is configured to include the saturation processing circuit unit 4 including a digital circuit for limiting an output value of the operation unit 6 to an upper limit value, and to store the upper limit value in the rewritable memory 8. When the upper limit value is increased, a temperature stabilizing time of a heated body is reduced, and the maximum current value of the heater 5 becomes large. On the other hand, when the upper limit value is reduced, the temperature stabilizing time of the heated body is increased, and the maximum current value of the heater 5 becomes small. Thus, freely setting the upper limit value in the memory 8 allows adjusting the priority between reduction of the temperature stabilizing time of the crystal units 10 and 20, which are the heated bodies, and suppression of the maximum current of the heater 5 at start-up. Thus, a manufacturer can easily produce the oscillator corresponding to the requirement for the priority of each user.

The operation unit 6 is not limited to be constituted by the P controller 61 and the I controller 62. It is only necessary that the operation unit 6 receives an output from the first addition unit 60 and has input-output characteristics preset for smooth control of the heater 5. A detected temperature value to be input into the first addition unit 60 is not limited to a detected temperature value obtained by the circuit in FIG. 1. The detected temperature value may be, for example, an output from a temperature sensor such as a thermistor. From the saturation processing circuit unit 4 in FIG. 5, the digital comparator 42, which restricts the input value to the lower limit value, may be eliminated. However, in this case, a logic circuit of the selector 43 is configured as follows. When the output value of the digital comparator 41 is "0," the input value (IN) is output. When the output value of the digital comparator 41 is "1," the upper limit value is output.

A plurality of the upper limit values may be preliminarily stored in the memory 8, and the pre-set value may be selected by the external computer. This has a meaning that the upper limit value in the memory 8 can be rewritten by the external computer 9 in this case. Since the upper limit value in the saturation processing circuit unit 4 can be also changed by such a configuration, the start-up time and the upper limit of the maximum current value of the heater 5 can be adjusted. The temperature control device of the disclosure is not limited to an application to the oscillator. For example, these may also be applied to a heat treatment device that a processing object is heat-treated at a certain temperature and the like. Furthermore, a resistor may be used as the rewritable memory 8, and the upper limit value may be directly written by the external computer 9. Alternatively, it is not limited to the external computer 9. The device may include an input operation unit, and the upper limit value may be rewritten by the input operation unit.

What is claimed is:

1. A temperature control device for controlling a temperature of a heated body heated by a heater to a target temperature, the temperature control device comprising:
   a temperature detector that detects a temperature corresponding to the heated body;
   a difference operation unit that operates a digital value corresponding to a difference value between a detected temperature value detected by the temperature detector, and the target temperature;
   a controller that calculates a manipulated variable using the digital value operated by the difference operation unit as an input value and outputs the manipulated variable as the digital value;
   a saturation processing circuit unit that being connected to a rear stage of the controller and including a digital circuit to limit an output value of the controller to a pre-set upper limit value;
   a rewritable storage unit that stores the upper limit value, and the upper limit value being read from a storage area of the rewritable storage unit and being input into the saturation processing circuit unit; and a conversion unit that converts the output value of the saturation processing circuit unit into an analog signal to output the converted value as a control command value to the heater.

2. The temperature control device according to claim 1, further comprising:
a connection unit, being connected to an external computer; and
the external computer is for writing or rewriting the upper limit value to the rewritable storage unit.

3. The temperature control device according to claim 1, wherein
the controller includes: a proportional operation unit, an integration circuit, and an addition unit,
the proportional operation unit multiplying a proportional gain to obtain a manipulated variable proportional to an input value,
the integration circuit operating a time integration value of an input value,
the addition unit obtaining an addition output of an operating value of the proportional operation unit and an operating value of the integration circuit.

4. The temperature control device according to claim 1, wherein
the saturation processing circuit unit includes: a first digital comparator, a second digital comparator, and a selector,
the pre-set upper limit value being input into one input terminal of the first digital comparator, the output value of the controller being input into another input terminal of the first digital comparator,
a lower limit value for restricting a lower limit of the output value of the controller being input into one input terminal of the second digital comparator,
the output value of the controller being input into another input terminal of the second digital comparator,
the selector selecting the output value of the controller, the upper limit value, or the lower limit value according to a combination of respective output values of the first digital comparator and the second digital comparator, and
the lower limit value is set to a value with a sign opposite to a positive/negative sign of when the detected temperature value is equal to or less than the target temperature.

5. The temperature control device according to claim 1, wherein
the saturation processing circuit unit includes: a first digital comparator and a selector,
the pre-set upper limit value being input into one input terminal of the first digital comparator,
the output value of the controller being input into another input terminal of the first digital comparator,
the selector selecting the output value of the controller or the upper limit value according to an output value from the first digital comparator.

6. An oscillator, comprising:
the temperature control device according to claim 1;
an oscillator circuit, being connected to a crystal unit as the heated body; and
a connection unit, being connected to an external computer, and the external computer is to rewrite the upper limit value stored in the rewritable storage unit.

7. An oscillator, comprising:
the temperature control device according to claim 3;
an oscillator circuit, being connected to a crystal unit as the heated body; and a connection unit, being connected to an external computer, and the external computer is to rewrite the upper limit value stored in the rewritable storage unit.

8. An oscillator, comprising:
the temperature control device according to claim 4;
an oscillator circuit, being connected to a crystal unit as the heated body; and
a connection unit, being connected to an external computer, and the external computer is to rewrite the upper limit value stored in the rewritable storage unit.

9. An oscillator, comprising:
the temperature control device according to claim 5;
an oscillator circuit, being connected to a crystal unit as the heated body; and
a connection unit, being connected to an external computer, and the external computer is to rewrite the upper limit value stored in the rewritable storage unit.

10. The oscillator according to claim 6, wherein
the temperature detector includes: a first crystal unit, a second crystal unit, a first oscillator circuit, a second oscillator circuit, and a circuit,
the first oscillator circuit oscillating the first crystal unit,
the second oscillator circuit oscillating the second crystal unit,
the circuit taking out a value corresponding to a difference in oscillation frequency of the first and second oscillator circuits, and
the temperature detector and the heater are disposed in a common housing.

11. The oscillator according to claim 7, wherein
the temperature detector includes: a first crystal unit, a second crystal unit, a first oscillator circuit, a second oscillator circuit, and a circuit,
the first oscillator circuit oscillating the first crystal unit,
the second oscillator circuit oscillating the second crystal unit,
the circuit taking out a value corresponding to a difference in oscillation frequency of the first and second oscillator circuits, and
the temperature detector and the heater are disposed in a common housing.

12. The oscillator according to claim 8, wherein
the temperature detector includes: a first crystal unit, a second crystal unit, a first oscillator circuit, a second oscillator circuit, and a circuit,
the first oscillator circuit oscillating the first crystal unit,
the second oscillator circuit oscillating the second crystal unit,
the circuit taking out a value corresponding to a difference in oscillation frequency of the first and second oscillator circuits, and
the temperature detector and the heater are disposed in a common housing.

13. The oscillator according to claim 9, wherein
the temperature detector includes: a first crystal unit, a second crystal unit, a first oscillator circuit, a second oscillator circuit, and a circuit,
the first oscillator circuit oscillating the first crystal unit,
the second oscillator circuit oscillating the second crystal unit,
the circuit taking out a value corresponding to a difference in oscillation frequency of the first and second oscillator circuits, and
the temperature detector and the heater are disposed in a common housing.

* * * * *